United States Patent [19]
Van Den Berg

[11] Patent Number: 5,459,871
[45] Date of Patent: Oct. 17, 1995

[54] DETECTION AND RESOLUTION OF RESOURCE DEADLOCKS IN A DISTRIBUTED DATA PROCESSING SYSTEM

[75] Inventor: Thomas W. Van Den Berg, Burnage, Great Britain

[73] Assignee: International Computers Limited, London, England

[21] Appl. No.: 112,776

[22] Filed: Aug. 26, 1993

[30] Foreign Application Priority Data

Oct. 24, 1992 [GB] United Kingdom .................. 9222390
Apr. 29, 1993 [GB] United Kingdom .................. 9308877

[51] Int. Cl.$^6$ ................................................. G06F 13/00
[52] U.S. Cl. ..................... 395/650; 395/600; 395/726; 364/281.5; 364/281.6; 364/246.8; 364/DIG. 1
[58] Field of Search .............................................. 395/725

[56] References Cited

U.S. PATENT DOCUMENTS

| | | | |
|---|---|---|---|
| 5,095,421 | 3/1992 | Freund .................................... | 395/650 |
| 5,251,318 | 10/1993 | Nitta et al. ............................ | 395/725 |
| 5,280,619 | 1/1994 | Wang .................................... | 395/725 |
| 5,339,427 | 8/1994 | Elko ...................................... | 395/725 |

OTHER PUBLICATIONS

Roesler, "Efficient deadlock resolution for lock-based currency control schemes", 8th Int. Conf. on Distributed Computer Systems, Jun. 13, 1988, pp. 224–233.

Rahm, "Recovery Concepts for data sharing systems", 21st Int. Symp. on Fault–Tolerant Computing, Jun. 25, 1991, pp. 368–375.

Johnson, "Sender–based message logging", 17th Int. Symp on Fault–Tolerant Computing, Jul. 6, 1987; pp. 14–19.

Babaoglu, "Fault–tolerant computing based on Mach", Operating Systems Review, vol. 24, No. 1, Jan. 1990, pp. 27–39.

Primary Examiner—Gopal C. Ray
Assistant Examiner—John Travis
Attorney, Agent, or Firm—Mann, Smith, McWilliams, Sweeney & Ohlson Lee

[57] ABSTRACT

A distributed data processing system includes a distributed resource manager which detects dependencies between transactions caused by conflicting lock requests. A distributed transaction manager stores a wait-for graph with nodes representing transactions and edges connecting the nodes and representing dependencies between the transactions. Each edge is labelled with the identities of the lock requests that caused the dependency. The distributed transaction manager propagates probes through the wait-for graph, to detect cyclic dependencies, indicating deadlock. A deadlock message is then sent to the resource manager identifying a particular lock request as a victim for deletion to resolve the deadlock. Resilience to failure is achieved by duplicating between agents and servers, rather than by duplicating the servers. As a result, the number of messages between agents and servers in normal operation is not increased.

5 Claims, 4 Drawing Sheets

DETECTION AND RESOLUTION OF RESOURCE DEADLOCKS IN A DISTRIBUTED DATA PROCESSING SYSTEM

BACKGROUND OF THE INVENTION

This invention relates to distributed data processing systems.

Such a system generally includes a number of resources which may be accessed by a number of user processes. Access to the resources may be controlled by a lock management mechanism. When a user process requires to access a resource, it requests a lock for that resource. If the lock cannot be granted immediately, it is queued.

In such a system, dependencies can occur between transactions; that is, one transaction may be held up, waiting for another to release a lock on a particular resource. If the dependencies become cyclic all the transactions in the cycle are held up waiting for each other. This is referred to as a deadlock.

To overcome this problem, deadlock detection mechanisms have been proposed. When a deadlock is detected, one of the transactions in the cycle is selected as a "victim", and is aborted so as to break the deadlock.

The object of the present invention is to provide an improved deadlock detection and resolution mechanism.

SUMMARY OF THE INVENTION

According to the invention there is provided a distributed data processing system comprising a plurality of processing units wherein the processing units contain:

(a) a plurality of resources, (b) a plurality of user processes performing transactions which require access to the resources, and for producing lock requests, requesting locks on the resources for said transactions, (c) a resource manager responsive to said lock requests from the user processes, for maintaining a queue of lock requests that cannot be immediately granted, and for detecting dependencies between transactions caused by conflicting lock requests, (d) means for storing a wait-for graph comprising a plurality of nodes representing transactions and a plurality of edges interconnecting the nodes and representing said dependencies between the transactions, each edge being labelled with the identities of the lock requests that caused the dependency, and (e) means for detecting a cyclic chain of dependencies in the wait-for graph and, upon detection of a cyclic chain of dependencies, for sending a deadlock message to the resource manager identifying a particular lock request as a victim for deletion to resolve the deadlock.

It can be seen that the invention allows deadlock to be detected and resolved on the basis of individual locks within transactions. As a result, deadlock can be restricted to a lock within a transaction, and the user does not have to abort the whole transaction. Deadlock is detected, not on the basis of time-outs, but by efficiently transmitting information on dependencies between locks.

DESCRIPTION OF AN EMBODIMENT OF THE INVENTION

One distributed data processing system in accordance with the invention will now be described by way of example with reference to the accompanying drawings.

Figure 1:
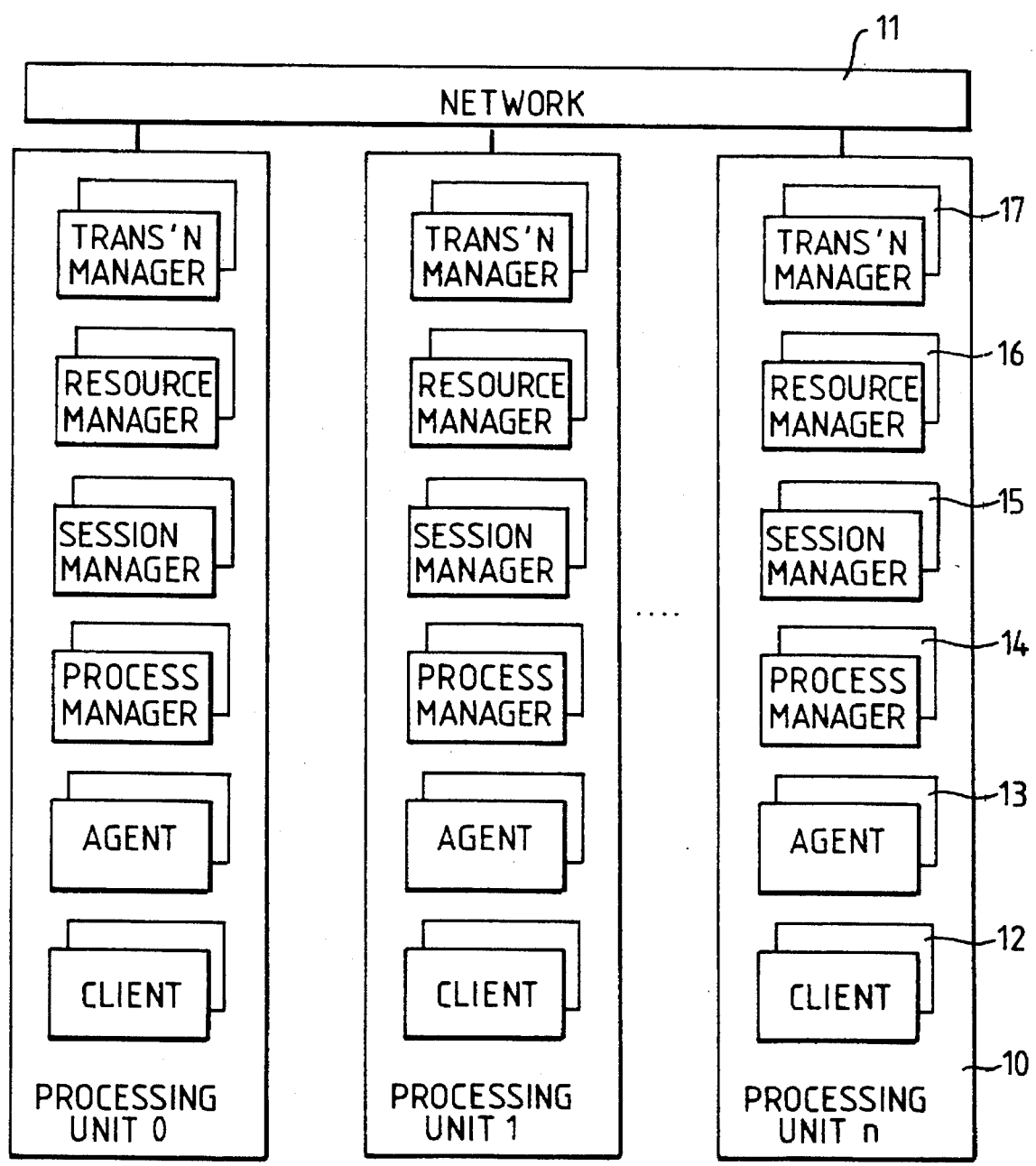
FIG. 1 is an overall block diagram of a distributed data processing system in accordance with the invention.

Referring to FIG. 1, the system comprises a number of processing units 10, interconnected by a communications network 11 which allows messages to be passed between the processing units.

A number of client programs 12 are distributed amongst the processing units. A client program may, for example, be a database program or some other user application. The clients access a number of resources which may, for example, be data items.

Access to the resources is controlled by a distributed lock manager (DLM) which consists of a set of agents 13 and servers, distributed amongst the processing units. The servers include process managers (PM) 14, session managers (SM) 15, resource managers (RM) 16 and transaction managers (TM) 17.

Agents

Each agent represents a set of clients, ie it acts as an interface between those clients and the distributed lock manager. Each client is represented by at most one agent. For example, in a UNIX system, the agent may be the UNIX kernel and a client may be a UNIX process.

Process Managers

The distributed lock manager views the clients as a set of processes. More than one process may be associated with each client. Each process is owned by a particular agent, and each process is identified by a process identifier that is unique within the lock manager.

The process managers PM keep a record of the processes that have been created, and their owners. Each process manager maintains information about a subset of processes.

Session Managers

The session managers keep a record of the sessions that have been opened, and their owners.

A session is defined as the unit of processing to which locks may be granted. A session is owned by one or more processes of the same agent. Processes may open and close sessions and the same session may be opened by different processes. Locks that are owned by a session may thus be accessed by different processes. Clients identify a session by a session name supplied by the client when the session is opened. The lock manager identifies a session by a session identification which is unique within the lock manager.

Transaction Managers

A transaction is defined as the unit in a process that requests locks for resources. A transaction may be distributed over a plurality of sessions, not necessarily all owned by the same process. Each transaction has a transaction name provided by the client.

Figure 2:
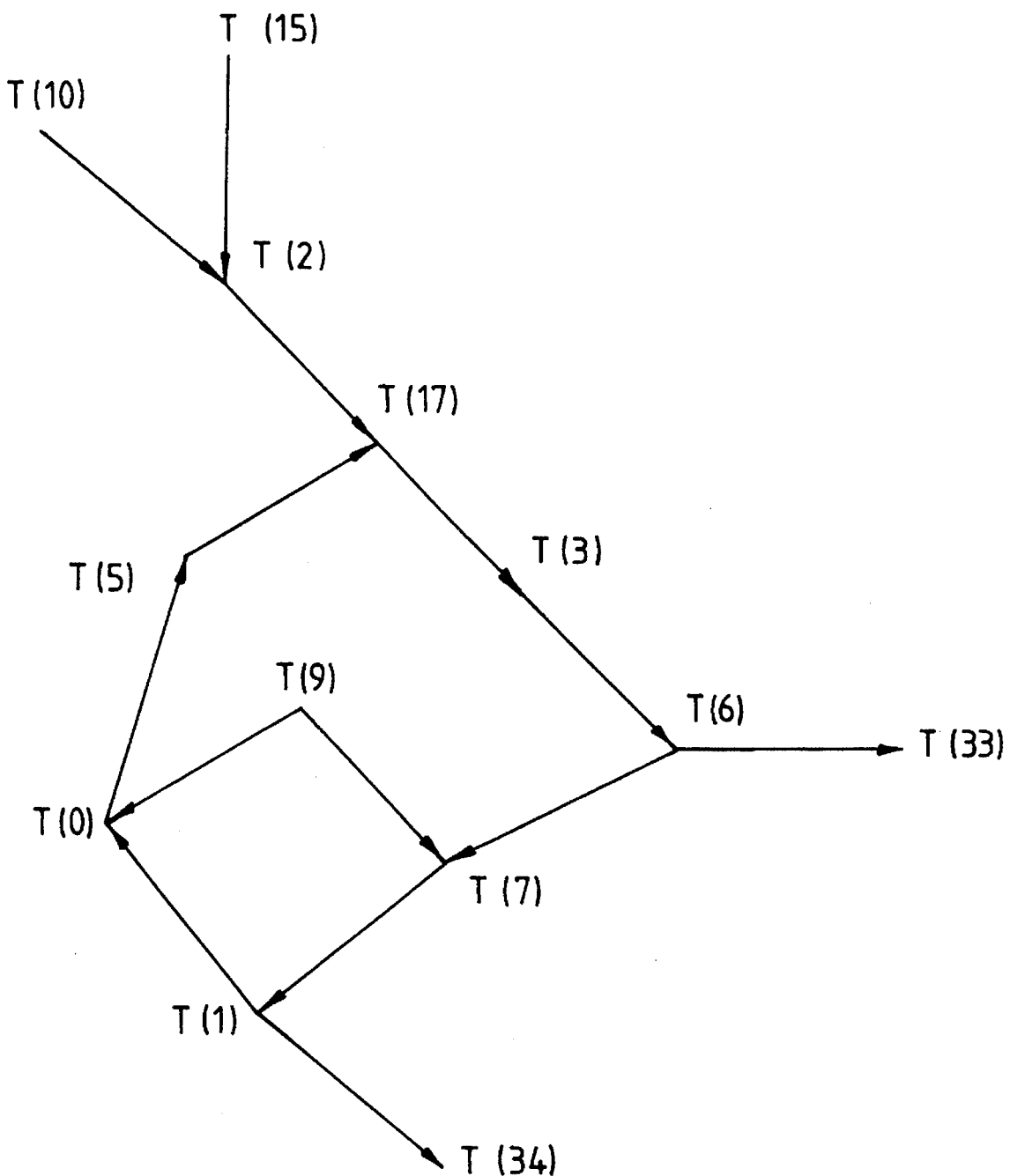
FIG. 2 is a schematic diagram of a global wait-for graph used by a deadlock detection mechanism.

Referring to FIG. 2, the transaction managers TM collectively maintain a directed graph structure, referred to as the wait-for graph (WFG), which indicates wait-for dependencies between transactions. The WFG consists of a set of nodes, interconnected by edges. The nodes of the WFG represent transactions, and the edges represent dependencies between transactions. Specifically, node T(i) represents transaction i, and an edge directed from a first node T(i) to a second node T(j) indicates that the transaction represented by the first node is waiting for the transaction represented by the second node to release a lock on a particular resource. The transaction that is waiting is referred to as the tail transaction, and the transaction that is waited for is referred to as the head transaction.

Figure 3:
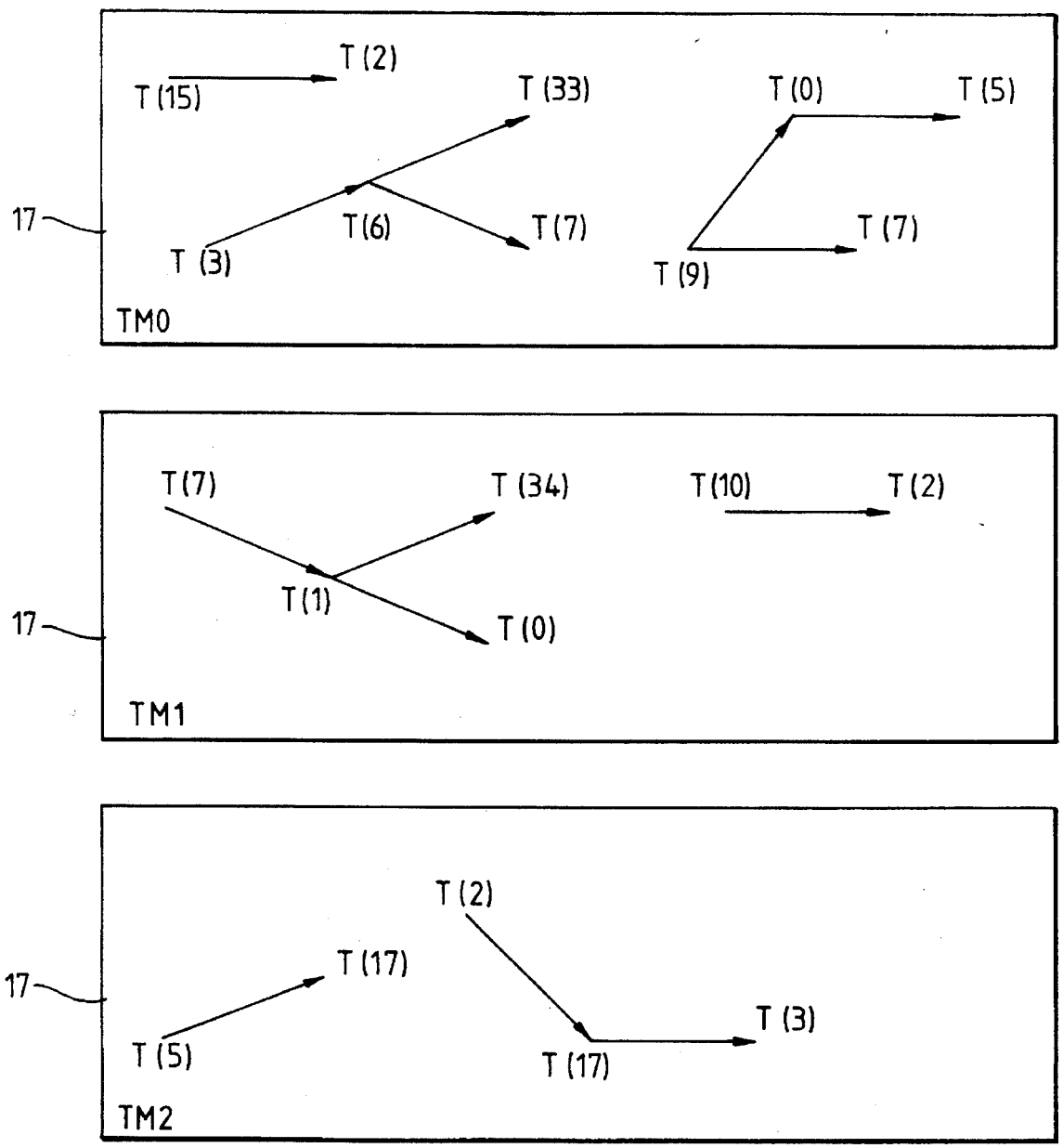
FIG. 3 is a schematic diagram showing the way in which the wait-for graph is distributed between individual transaction managers.

Referring now to FIG. 3, the WFG is distributed between the TMs such that each TM stores a sub-graph of the WFG. The nodes and edges of the WFG are distributed between the TMs in accordance with some predetermined mapping function that maps transaction identifiers on to the transaction managers. In this example, the node T(i), and all edges directed from that node, are held in transaction manager p, where:

p=i modulo n and n is the total number of TMs in the system.

It can be seen from FIG. 3 that, for example, TM2 stores information indicating that T(5) is dependent on T(17), T(2) is dependent on T(17), and T(17) is dependent on T(3).

Each edge in the WFG is labelled with an edge value (not shown in the drawing). The edge value indicates between which two locks of both transactions the dependency exists. There can be multiple edges between the same two nodes, since more than one lock of one transaction can wait for more than one lock of another transaction. The edge value uniquely identifies each edge between two transactions.

It can be seen that any cyclic chain of edges in the WFG indicates a deadlock situation in which a number of transactions are held up waiting for each other to release locks. For example, in FIG. 2, it can be seen that transactions 17, 3, 6, 7, 1, 0 and 5 are cyclically dependent on each other and hence there is a potential deadlock. Deadlock cycles are detected by the TMs by propagating special messages, referred to as probes, through the WFG. A probe is initiated whenever an edge is inserted in the WFG, and carries the value of this edge (referred to as the initiating edge) with it while propagating through the WFG. Each node has a priority associated with it, determined by a timestamp value, and probes are propagated through the WFG according to a priority scheme, a probe being forwarded along an edge only if the head transaction of that edge has a lower priority than the tail transaction of the probe-initiating edge. This reduces the number of probe messages required.

As the probe traverses the WFG, copies of it are stored in each node of the WFG through which it passes. If there exists more than one path through which a probe can reach a node, the same probe may be received more than once. Only the first received copy of the probe is stored in the node. Any subsequently received copies increment a count in the stored copy of the probe, but are not propagated any further through the WFG. If a probe returns to its initiating edge then a deadlock is detected. The deadlock is resolved by selecting one of the locks in the cycle as a "victim" to be cancelled.

When an edge is deleted from the WFG an antiprobe message is initiated. The antiprobe follows the same route as the probe that was initiated when this edge was inserted, but reverses that probe's actions. If the count value for a probe stored at a node is greater than one, the count is decreased by one and the antiprobe is not further forwarded. If the count value is one, the stored probe is removed from the node and the antiprobe is forwarded.

It can be shown that by using this priority scheme a deadlock cycle is detected by exactly one probe that is initiated from an edge in the cycle.

Resource Managers

The resource managers RM keep a record of the locks that have been granted for resources. Each lock has one of the following lock modes which indicate the required level of access to a resource:

Null (N): This mode grants no access to the resource.

Intention-shared (IS): This mode grants read access to the resource and allows sharing of the resource with other readers. Writers are allowed to the resource.

Intention-exclusive (IX): This mode grants write access to the resource and allows sharing of the resource with other writers.

Shared (S): This mode grants read access to the resource and allows the resource to be shared with other readers. No writers are allowed access to the resource.

Shared and intention-exclusive (SIX): This mode grants write access to the resource and allows the resource to be shared with intention-shared mode readers. No other writers are allowed access to the resource.

Exclusive (X): The exclusive mode grants write access to the resource and prevents the resource from being shared with any other readers or writers.

Locks that can be shared with other locks are said to have compatible lock modes. Table 1 shows the compatibility of the lock modes.

TABLE 1

|     | N   | IS  | IX  | S   | SIX | X   |
|-----|-----|-----|-----|-----|-----|-----|
| N   | yes | yes | yes | yes | yes | yes |
| IS  | yes | yes | yes | yes | yes | no  |
| IX  | yes | yes | yes | no  | no  | no  |
| S   | yes | yes | no  | yes | no  | no  |
| SIX | yes | yes | no  | no  | no  | no  |
| X   | yes | no  | no  | no  | no  | no  |

Thus, it can be seen for example that the intention-shared (IS) mode is compatible with all the other modes except the exclusive (X) mode.

Clients may open and close locks on resources and convert the mode of an opened lock to a different mode. A lock is always opened in the NULL mode which is, by definition, compatible with all other locks. However, a lock in NULL mode is not effective until it is converted to a more restrictive mode.

If a lock conversion changes a lock to a mode that is incompatible with other opened locks, the lock conversion has to wait and the lock is queued on a waiting queue. When a lock conversion is granted or cancelled, or a lock is closed, other lock conversions that are queued on the waiting queue may be granted. The RM then checks whether any new wait-for dependencies have been created, or any existing dependencies removed. A dependency may exist between a lock on the waiting queue and either a granted lock, or another lock further ahead of it on the waiting queue. If a dependency has been created, the RM sends a message to the appropriate TM, instructing it to insert a new edge in the WFG. Conversely, if a dependency has been removed, the RM sends a message to the appropriate TM, instructing it to delete the corresponding edge of the WFG.

Each resource has an associated value block. The first time a lock is opened for a resource, the lock manager associates a value block with the resource. The lock manager maintains the resource and its value block until all locks on the resource have been closed. A value block contains an value block status and a value block value. The status is either valid or invalid. The value block value contains some client supplied value, provided that the value block status is valid. By default the resource value block status is initialised to invalid. Clients may read or write the value block of a resource, depending on the mode of the lock they have opened on the resource.

Communication Between Clients and Agents

Figure 4:
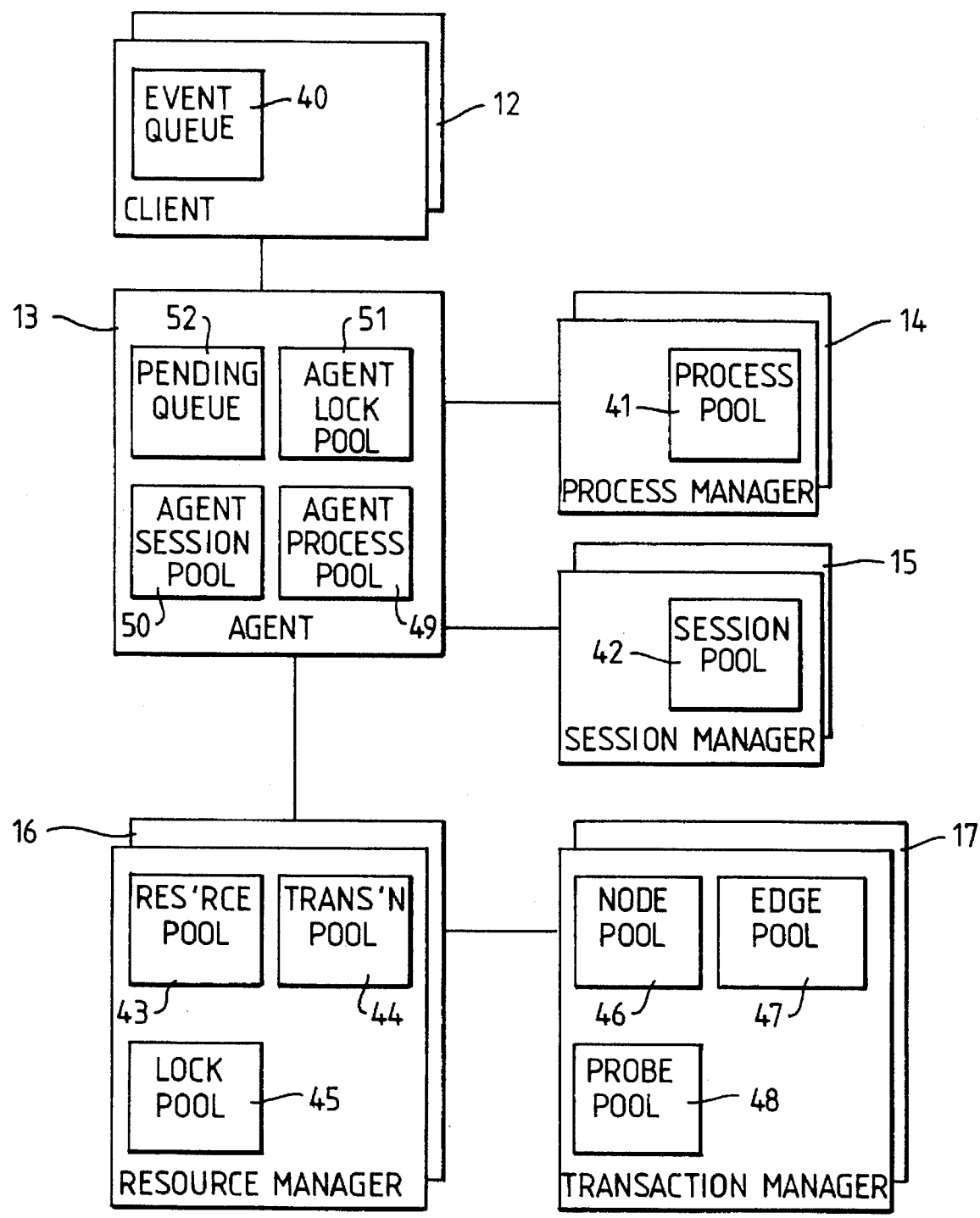
FIG. 4 is a block diagram showing the various components of the system and the data structures used by them.

Referring now to FIG. 4, each client 12 has an associated event queue 40. A client communicates with the distributed lock manager by sending function calls to the agent 13 that represents it. The agent may return information to the client synchronously in response to the function call. Alternatively, the agent may respond asynchronously by posting an event on the client's event queue. Clients poll events from their event queues.

Data Structures

The agents and servers in the distributed lock manager maintain a number of data structures, referred to herein as pools. Each pool consists of a set of tuples, each tuple consisting of a set of data members. Each process manager PM maintains a process pool 41, each session manager SM maintains a session pool 42, each resource manager RM maintains a resource pool 43, a transaction pool 44, and a lock pool 45, each transaction manager TM maintains a node pool 46, an edge pool 47 and a probe pool 48, and each agent maintains an agent process pool 49, an agent session pool 50, an agent lock pool 51, and a pending queue 52.

Process Pool

The process pool consists of a set of process tuples, each of which contains information about a particular process. Each tuple comprises the following members.

owner: the identity of the agent that owns the process.

prcid: the process identifier.

Session Pool

The session pool consists of a set of session tuples, each of which contains information about a particular session. Each session tuple comprises the following members.

owner: the identity of the agent that owns the session.

sesid: the identity of the session.

sesname: the session name supplied by the agent.

prcid_set: a set of identifiers, identifying the processes involved in the session.

Resource Pool

The resource pool consists of a set of resource tuples, each of which contains information about locks that have been opened for a particular resource. Each resource tuple comprises the following members.

rscname: a resource name that uniquely identifies the resource tuple in the resource pool. This name is supplied by the client.

lckid_set: a set of lock identifiers for the locks that are currently open for this resource. A subset of this set may be queued on the waiting queue of the resource.

waiting_queue: a set of lock identifiers for the locks that are currently on the waiting queue of the resource.

vlblk: the value block of the resource.

Transaction Pool

The transaction pool consists of a set of transaction tuples, each of which holds information about a particular transaction. Each transaction tuple comprises the following members.

traname: a transaction name that uniquely identifies the transaction tuple in the transaction pool. This name is supplied by the agent.

lckid_set: a set of lock identifiers specifying the locks that are owned by this transaction.

Lock Pool

The lock pool consists of a set of lock tuples, each of which holds information about a particular lock. Each lock tuple comprises the following members.

owner: the identity of the agent that owns the lock.

lckid: a lock identification that uniquely identifies the lock tuple in the lock pool. This identification is unique within the RMs.

sesid: the identifier of the session that owns this lock.

rscname: the name of the resource controlled by this lock.

traname: the name of the transaction that requested this lock.

status: this is either "granted" (not queued on waiting queue) or "waiting" (queued on waiting queue).

granted_mode: the lock mode in which the lock has been granted.

waiting_mode: if a conversion has been requested for the lock, this holds the mode to which the lock is to be converted.

key: if the lock status is waiting, this identifies a corresponding pending tuple on the pending queue of the agent that owns this lock tuple.

Node Pool

The node pool consists of a set of node tuples, each of which holds information about a particular WFG node. Each node tuple comprises the following members.

traname: the name of the transaction represented by this node.

stamp: a timestamp value, unique within the TMs.

card: the cardinality of the node tuple, ie a count value.

Edge Pool

The edge pool consists of a set of edge tuples, each of which holds information about a particular edge in the WFG. Each edge tuple comprises the following members.

owner: the identity of the RM that owns this edge tuple.

edge_label: this uniquely identifies the edge tuple in the edge pool, and comprises a label (t1, t2, l1, l2), where t1 and t2 are the tail and head transactions of the edge, and l1 and l2 are the locks in t1 and t2 that caused the wait-for dependency represented by this edge.

card: the cardinality of the edge tuple, ie a count value.

Probe Pool

The probe pool consists of a set of probe tuples, each of which contains information about a stored probe. Each probe tuple comprises the following members.

owner: the TM that owns this probe tuple.

init_edge: the label of the edge in the WFG that initiated this probe.

stamp: a timestamp for the tail transaction of the initiating edge.

node: the node at which this probe is stored.

card: the cardinality of the probe tuple, ie a count value.

Agent Process Pool

The agent process pool consists of a set of process tuples, each with the following members.

owner: this identifies the PM that owns the process.

prcid: the process identification, which uniquely identifies the process tuple in the process pool.

client: this identifies the client associated with this process.

Agent Session Pool

The agent session pool consists of a set of session tuples, each with the following members.

owner: this identifies the SM that owns this session.

sesid: the session identification, which uniquely identifies the session tuple in the session pool.

sesname: a client-supplied name for the session.

prcid_set: the identifiers of all processes that have opened the session.

Agent Lock Pool

The agent lock pool consists of a set of lock tuples, each of which has the following members.

owner: this identifies the RM that owns this lock.

lckid: this uniquely identifies the lock tuple in the lock pool.

sesid: this identifies the session that owns this lock.

rscname: this identifies the resource for which the lock is queued, and is supplied by the client.

traname: this identifies the transaction for which this lock is queued, and is supplied by the client.

granted_mode: this identifies the lock mode in which the lock is currently granted.

vlblk: the resource value block.

uhandle: a user handle for the lock.

Pending Queue

The pending queue holds pending requests from this agent to the servers. The pending queue is an ordered list of pending tuples. Each pending tuple has the following members.

owner: this identifies the server for which the request is pending.

key: this is an identification for the pending tuple, which uniquely identifies the tuple on the agent's pending queue.

client: this identifies the client on whose behalf the agent made the request.

uhandle: a user handle for the request. The meaning of this value is private to the client.

request: the request message that has been sent to the server.

Operation

The operation and interaction of the various components of the distributed lock manager will now be described.

Create Process

When a client C requires to create a process, it sends a call lm_create_process(uhandle) to the agent Ak that represents C.

When it receives this call, the agent Ak randomly selects a process manager PMi, sends a NEWPROCESS(key) message to PMi, and queues a pending tuple (PMi,key,C, uhandle,message) in its pending queue. Ak then returns a LM_SUCCESS status to the client.

When PMi receives the NEWPROCESS(key) message from Ak, it constructs a process identification prcid and inserts a process tuple (Ak,prcid) in its process pool. PMi then replies with a NEWPROCESSCOMPLETE(key,prcid) message to Ak.

When Ak receives the NEWPROCESSCOMPLETE(key, prcid) message from PMi, it removes the related pending tuple from its pending queue and inserts the process tuple (PMi,prcid) in its process pool. Ak then posts a lm_create_process(uhandle,LM_SUCCESS,prcid) event on C's event queue.

Delete Process

When a client C requires to delete a process, it sends a call lm_delete_process(uhandle,prcid) to the agent Ak that represents C.

When Ak receives this call, it looks up the process tuple in its process pool. If it cannot find the tuple, the process identifier prcid must be invalid and so an LM_INVPRCID status is returned to C. If it finds the tuple, Ak checks whether C is the owner of the tuple and, if it is not, returns a LM_NOTOWNER status to C.

Assuming that Ak found the tuple and C is the owner, Ak then sends a DELPROCESS(prcid) message to the process manager PMi that owns the process tuple identified by prcid. Ak then removes the process tuple from its process pool. Ak then closes all sessions that are opened by this process, and returns a LM_SUCCESS status to C.

When PMi receives the DELPROCESS(prcid) message from Ak, it looks up the process tuple that is identified by prcid and removes it from its process pool.

Open Session

When a client C wishes to open a new session, it sends a call lm_open_session(uhandle,prcid,sesname) to the agent Ak that represents the client C.

When Ak receives this call, it selects the session manager SMi that maintains the session tuple identified by sesname, in accordance with a predetermined mapping function that maps session names on to session managers. Ak then sends an OPENSESSION(key,prcid,sesname) message to SMi and queues a pending tuple (SMi,key,C,uhandle,message) in its pending queue. Ak then returns a LM_SUCCESS status to C.

When SMi receives the OPENSESSION(key,prcid,sesname) message from Ak, it looks up the session tuple identified by sesname. If SMi cannot find the session tuple, it constructs a new session tuple with Ak as owner and adds it to its session pool.

If the tuple is found, SMi checks whether the session tuple is owned by Ak. If it is not owned by Ak, SMi returns the message OPENSESSIONCOMPLETE(key,sesid,LM_NOTOWNER) to Ak. When it receives this message, Ak removes the related pending tuple from its pending queue, and posts a lm_open_session(uhandle,LM_NOTOWNER, sesid) event on C's event queue.

If a tuple owned by Ak was found, or a new tuple was created, SMi then adds prcid to prcid_set in the session tuple, and replies with an OPENSESSIONCOMPLETE(key, sesid,LM_SUCCESS) message to Ak.

When Ak receives the OPENSESSIONCOMPLETE(key, sesid,LM_SUCCESS) message from SMi, it removes the related pending tuple from its pending queue. Ak then looks up the session tuple in its session pool. If it cannot be found, a session tuple is constructed and added to the pool. Finally, Ak adds prcid to the prcid_set in the session tuple and posts a lm_open_session(uhandle,LM_SUCCESS,sesid) event on C's event queue.

Close Session

When a client C requires to close a session, it sends a call lm_close_session(uhandle,prcid,sesid) to the agent Ak that represents C.

Ak looks up the session tuple in its session pool. If it cannot find the tuple, the sesid must be invalid and so a LM_INVSESID status is returned to C. If C is not the owner of the session tuple, Ak returns a LM_NOTOWNER status to C.

If a tuple owned by C was found, Ak sends a CLOSESESSION(prcid,sesid) message to SMi, where SMi is the session manager that owns the session tuple identified by sesid. Ak then removes prcid from the prcid_set in the session tuple. If prcid_set becomes empty as a result of this, Ak closes all locks that are owned by the session. Ak then returns an LM_SUCCESS status to C.

When SMi receives the CLOSESESSION(prcid,sesid) message from Ak, it looks up the session tuple in its session pool and removes prcid from the prcid_set of the session tuple. If prcid_set becomes empty as a result of this, the session tuple is removed from the session pool.

Open Lock

When a client C requires to open a lock, it sends the call lm_open_lock(uhandle,sesid,rscname,traname) to the agent Ak that represents C, where rscname is the name of the resource on which the lock is requested, and traname is the name of the transaction that requires the lock.

When Ak receives this call, it selects the resource manager RMi that maintains the resource tuple identified by rscname, according to a predetermined mapping function that maps resource names on to the resource managers. Ak sends an OPENLOCK(key,sesid,rscname,traname) message to RMi and queues a pending tuple (RMi,key,C,uhandle, message) in its pending queue. Ak then returns a LM_SUCCESS status to C.

When RMi receives the OPENLOCK(key,sesid,rscname, traname) message from Ak, it looks up the resource tuple identified by rscname in its resource pool. If it cannot be found, the resource tuple is constructed and added to the resource pool. The resource tuple is constructed with an invalid value block. RMi then looks up the transaction tuple identified by traname in its transaction pool. If it cannot be found, the transaction tuple is constructed and added to the transaction pool. RMi then constructs a lock tuple and adds it to the lock pool. RMi also adds the lock to the lock set of the resource tuple and to the lock set of the transaction tuple. RMi then sends an OPENLOCKCOMPLETE(key,lckid,vlblk) message to Ak. The message includes the resource value block vlblk.

When Ak receives the OPENLOCKCOMPLETE(key, lckid,vlblk) message from RMi, it removes the related pending tuple from its pending queue. Ak then constructs a lock tuple and adds the lock tuple to its lock pool. Ak then posts a lm_open_lock(uhandle,LM_SUCCESS,lckid) event on C's event queue.

Close Lock

When a client C requires to close a lock, it issues the call lm_close_lock(uhandle,lckid) to the agent Ak that represents C.

When Ak receives this call, it looks up the lock tuple in its lock pool. If it cannot find the lock tuple, lckid must be invalid and so a LM_INVLCKID status is returned to C. Otherwise Ak proceeds with the following steps.

Ak sends a CLOSELOCK(lckid) message to the resource manager RMi that owns the lock tuple identified by lckid. Ak then removes the lock tuple from its lock pool and returns a LM_SUCCESS status to C. Any pending conversion or cancel remains on Ak's pending queue.

When RMi receives the CLOSELOCK(lckid) message from Ak, it looks up the lock tuple in its lock pool, and accesses the related resource and transaction tuples in its resource and transaction pools. RMi then checks whether any transaction dependencies have ceased as a result of closing the lock. If so, RMi sends DELEDGE messages to the appropriate TMs instructing them to delete the corresponding edges from the WFG. RMi then removes the lock from the set of locks in the transaction tuple and from the set of locks in the resource tuple and deletes the lock tuple from the lock pool. If the lock was on the waiting queue, Ak has an outstanding lock conversion, and so RMi sends a CONVERTUPCOMPLETE(key,lckid,vlblk,LM_CLOSED) message to Ak.

RMi then checks if any other locks in the waiting queue of the resource can now be granted. A lock from the head of waiting queue can be granted if the requested lock mode is compatible with the other granted locks. If the lock can be granted, it is removed from the waiting queue, and the lock tuple is updated by setting its granted mode to the requested conversion mode and its status to "granted". RMi then sends a CONVERTUPCOMPLETE(key,lckid,vlblk,LM_GRANTED) message to the lock owner agent of each newly granted lock. That agent then acts as described below for the case of an upward lock conversion.

If Ak receives a CONVERTUPCOMPLETE(key,lckid, vlblk,LM_CLOSED) message from RMi, it looks up the lock tuple in its lock pool, but in this case, it cannot find the tuple (since it has already removed the lock tuple from the lock pool). Ak then removes the related pending tuple from the pending queue and posts a lm_convert_lock(uhandle, LM_CLOSED,vlblk) event in C's event queue.

Lock Conversion

Two types of lock conversion are distinguished, namely upward lock conversion and downward lock conversion, according to the following table:

TABLE 2

| Current | New Mode | | | | | |
|---|---|---|---|---|---|---|
| Mode | N | IS | IX | S | SIX | X |
| N | down | up | up | up | up | up |
| IS | down | down | up | up | up | up |
| IX | down | down | down | up | up | up |
| S | down | down | up | down | up | up |
| SIX | down | down | down | down | down | up |
| X | down | down | down | down | down | down |

Thus, it can be seen for example that converting a lock from intention-shared (IS) to exclusive (X) is classified as an upward conversion, since the new mode is more restrictive than the old mode.

An upward lock conversion brings a lock in a more restrictive lock mode and such a conversion is only granted if (1) there are no other conversions outstanding on the resource and (2) the requested mode is compatible with the other granted lock modes. A downward lock conversion brings a lock into a less restrictive lock mode and is always immediately granted. The agent can determine if a conversion is upward or downward from the lock information that it keeps in its lock pool and from the requested conversion mode.

The essential difference between the two is that a downward lock conversion does not require any completion message, whereas an upward lock conversion does. On a downward lock conversion, the agent updates its lock tuple prior to sending the convert lock message. On an upward lock conversion, the agent updates its lock tuple when it receives a reply from the RM. A downward lock conversion is always immediately granted, whereas an upward lock conversion potentially has to wait before it is granted.

When a client C requires to convert a lock, it issues the call lm__convert__lock(uhandle,lckid,mode,vlblk,notify) to the agent Ak that represents C.

When Ak receives this call, it looks up the lock tuple in its lock pool. If it cannot find the tuple, lckid must be invalid and so a LM__INVLCKID status is returned to the caller. If the tuple can be found, but another conversion is pending for the lock, a LM__ALREADY status is returned to the caller.

If the tuple was found, and no other conversion was pending, Ak proceeds as follows. First, Ak checks if the conversion is upward or downward by comparing the requested lock mode with the currently granted lock mode.

If the conversion is upward, Ak sends a CONVERTUP- (key,lckid,mode) message to the resource manager RMi that owns the lock tuple. Ak then queues a pending tuple (RMi,key,C,uhandle,message) in its pending queue and returns a LM__SUCCESS status to the caller.

When RMi receives the CONVERTUP(key,lckid,mode) message from Ak, it looks up the lock tuple and the related resource tuple for which the lock is queued. RMi then checks if the waiting queue of the resource is empty and the requested lock mode is compatible with the other granted locks. If so, RMi can grant the conversion immediately, and so it changes the granted mode in the lock tuple to the requested conversion mode, and sends a CONVERTUP- COMPLETE(key,lckid,vlblk,LM__GRANTED) message to Ak. If on the other hand RMi cannot grant the conversion immediately, the lock tuple is queued by adding its lock identifier to the waiting queue of the resource tuple. The lock tuple is then updated by setting its status to "waiting", its waiting mode to the requested conversion mode, and its key value to the key value from the message. RMi then checks whether any new transaction dependencies have been created as a result of queuing the lock conversion. If so, INSEDGE messages are sent to the appropriate TMs to instruct them to insert corresponding edges into the WFG.

When Ak receives a CONVERTUPCOMPLETE(key,lck- id,vlblk,LM__GRANTED) message from RMi, it checks if there is a pending cancel for the lock in its pending queue. If so, this cancel has failed and a lm__cancel__lock(uhandle, LM__GRANTED) event is posted on C's event queue. Ak then looks up the lock tuple in its agent lock pool. If Ak finds the lock tuple, it updates the lock tuple by setting its granted mode to the requested conversion mode and its value block to the returned value block from the message. Finally, Ak removes the related pending tuple from its pending queue and posts a lm__convert__lock(uhandle,LM__GRANTED, vlblk) event in C's event queue.

If on the other hand Ak cannot find the lock tuple, this means that the agent has closed the lock and the lock is closed or is being closed on server side. Ak therefore removes the related pending tuple from the pending queue and posts a lm__convert__lock(uhandle,LM__GRANTED, vlblk) event in C's event queue.

If the lock conversion is downward, Ak proceeds as follows. Ak sets the granted mode in the lock tuple to the requested conversion mode. Ak then sends a CONVERT- DOWN(lckid,mode,vlblk,) message to the resource manager RMi that owns the lock tuple, and returns a LM__SUC- CESS status to the caller.

When RMi receives the CONVERTDOWN(lckid,mode, vlblk) message from Ak, it looks up the lock tuple and related resource tuple, and changes the granted mode of the lock tuple to the requested conversion mode. RMi then checks whether any transaction dependencies have ceased as a result of the lock mode conversion. If so, RMi sends DELEDGE messages to the appropriate TMs, instructing them to delete the corresponding edges from the WFG.

RMi then checks if other locks in the waiting queue can be granted. A lock from the head of waiting queue can be granted if its requested lock mode is compatible with all currently granted locks. If the lock can be granted then it is removed from the waiting queue, and its lock tuple is updated by setting its granted mode to the requested conversion mode and its status to "granted". RMi then sends a CONVERTUPCOMPLETE ( key, lckid, vlblk, LM__GRANTED ) me s s age to the lock owner agent of each granted lock. That agent then acts as described above for the case of an upward lock conversion.

Cancel Lock Conversion

When a client C requires to cancel a lock conversion, it issues the call lm__cancel__lock(uhandle,lckid) to the agent Ak that represents C.

When Ak receives this call, it looks up the lock tuple in its lock pool. If it cannot find the tuple, lckid must be invalid and so a LM__INVLCKID status is returned to C. If the tuple is found, but no conversion is pending for the lock, a LM__GRANTED status is returned to C. Also if a cancel for the lock is pending, a LM__GRANTED status is returned to C. Otherwise Ak proceeds with the following steps.

Ak sends a CANCEL(key,lckid) message to the resource manager RMi that owns the lock tuple. Ak then queues a pending tuple (RMi,key,C,uhandle,message) in its pending queue and returns a LM_SUCCESS status to C.

When RMi receives the CANCEL(key,lckid) message from Ak, it looks up the lock tuple and related resource tuple. If the lock status is "granted", RMi discards the message and does not proceed with the following steps.

RMi checks whether any transaction dependencies have ceased as a result of cancelling the lock conversion. If so, DELEDGE messages are sent to the appropriate TMs, instructing them to remove the corresponding edges from the WFG. RMi then removes the lock tuple from the waiting queue and sets the lock status to "granted". RMi then sends a CONVERTUPCOMPLETE(key,lckid,vlblk,LM_CANCEL) message to the lock owner Ak.

When Ak receives this message, it removes the related pending tuple from the pending queue.

Edge Insertion

When a resource manager RMk detects a dependency between two transactions t1 and t2, caused by the two locks l1 and l2, the following actions are performed.

First, RMk selects the transaction manager TMi that holds the node t1, using the predetermined mapping function that maps transaction identifiers on to the transaction managers. RMk then sends an INSEDGE(label) message to TMi, where label= (t1, t2, l1, l2), instructing it to insert an edge into the WFG.

When TMi receives an INSEDGE(label) message from RMk, it searches its edge pool for an edge tuple with this label value. If the edge tuple cannot be found in the edge pool, TMi constructs a new edge tuple with owner RMk and with this label value, and adds it to the edge pool. Otherwise TMi increments the cardinality of the edge tuple.

TMi then looks up the node tuple identified by t1 in its node pool. If the node tuple cannot be found, TMi constructs a new node tuple with cardinality equal to 1, and adds this to the pool. The new node tuple is stamped with a timestamp that is unique within the TMs, and which determines the priority of the node. Otherwise TMi increments the cardinality of the node in the pool.

If the edge cardinality is equal to one, TMi performs the following actions. First, TMi sends a PROBE(init,stamp,t2) message to the transaction manager TMj that holds the node t2. The argument "init" is the label (t1, t2, l1, l2) of the newly inserted edge. The argument "stamp" is the timestamp of the node t1. TMi then looks up all probe tuples in the probe pool whose node value is equal to t1. For each tuple found, a PROBE(init,stamp,t2) message is sent to the transaction manager TMj that holds the node t2, where "init" is the init_edge label of the probe tuple, and "stamp" is the timestamp of that tuple. In other words, TMi forwards any stored probes to t2.

Edge Deletion

If a resource manager RMk detects that a dependency between two transactions t1 and t2, caused by two locks l1 and l1, has ceased to exist, the following actions are taken.

First, RMk selects the transaction manager TMi that holds the node corresponding to transaction t1. RMk then sends a DELEDGE(label) message to TMi, where label= (t1, t2, l1, l2).

When TMi receives a DELEDGE(label) message from RMk, it looks up the edge tuple identified by the argument "label" in its edge pool and subtracts one from its cardinality. If the cardinality has become zero, the edge tuple is removed from the pool.

TMi then looks up the node tuple identified by t1 in its node pool and subtracts one from its cardinality. If the node cardinality has become zero, the node tuple is removed from the pool.

If the edge cardinality is equal to zero, TMi now performs the following actions. First, TMi sends an ANTIPROBE(init,stamp,t2) message to the transaction manager TMj that holds the node corresponding to t2. The argument "init" is the label (t1, t2, l1, l2) of the deleted edge. The argument "stamp" is the timestamp of the node t1. TMi then looks up all probe tuples in the probe pool whose node value is equal to t1. For each tuple found, an ANTIPROBE(init,stamp,t2) message is send to the transaction manager TMj that holds the node corresponding to t2, where "init" is the init_edge label of the probe tuple, and "stamp" is the timestamp of that tuple. In other words, TMi forwards any stored antiprobes to t2.

WFG Probe

When a transaction manager TMi receives a PROBE(init, stamp,t) message from another transaction manager TMk, where init= (t1, t2, l1, l2), it performs the following actions.

First, TMi looks up the node tuple identified by t in its node pool. If the node cannot be found, a node tuple is constructed and added to the pool. Otherwise the cardinality of the node tuple is incremented by one.

TMi then searches its probe pool for a probe tuple whose init_edge value is equal to the init parameter in the probe message. If the probe tuple cannot be found, a probe tuple is constructed with cardinality equal to 1, and added to the pool. Otherwise the cardinality of the probe tuple in the pool is incremented by one.

TMi then checks for a deadlock cycle. If values t and t1 in the probe are equal, the probe has arrived back at its starting point. TMi looks up the edge in its edge pool and if the edge still exists a deadlock has been found. The probe is not further forwarded and TMi sends a DEADLOCK(init) message to the resource manager RMx that owns the edge.

If deadlock is not detected, TMi proceeds with the following steps. If the probe's cardinality is equal to one, TMi checks whether the timestamp of the probe is greater than the timestamp of node t. If so, TMi forwards the probe along all that node's outgoing edges. Thus, TMi looks up all edges e= (tail,head,l1,l2) in the edge pool where the tail is equal to t, and sends a PROBE(init,stamp,head) to the transaction manager TMj that holds the node corresponding to the transaction identified by the parameter "head" in the probe.

WFG Antiprobe

When a transaction manager TMi receives an ANTIPROBE(init,stamp,t) message from another transaction manager TMj, where init= (t1, t2, l1, l2), the following actions are performed.

First, TMi looks up the node tuple identified by t in its node pool and subtracts one from the cardinality of the node tuple. If the cardinality becomes zero, the node tuple is removed from the node pool.

TMi then looks up the probe tuple in its probe pool whose init_edge value is equal to the "init" parameter in the antiprobe, and subtracts one from the cardinality of the probe tuple. If the cardinality becomes zero, the probe tuple is removed from the probe pool.

TMi then checks whether the values t and t2 in the antiprobe are equal. If so, the antiprobe has arrived back at its starting point and is not further forwarded.

If the cardinality of the probe tuple became zero, TMi checks whether the timestamp in the antiprobe is greater than the timestamp of node t. If so, TMi forwards the antiprobe along all that node's outgoing edges. Thus, TMi looks up all edges e= (tail,head,l1,l2) in the edge pool where "tail" is equal to t, and sends an ANTIPROBE(init, stamp,head) to the transaction manager TMj that holds the node corresponding to the head transaction of that edge.

Deadlock Resolution

When a transaction manager TMj detects a deadlock, it generates a deadlock message DEADLOCK(edge), where edge= (t1, t2, l1, l2). The deadlock message is sent to the resource manager RMi that owns the edge.

When RMi receives a deadlock message, it looks up the lock tuple identified by l1. If the lock tuple cannot be found or if the lock status is granted, then the deadlock message is discarded and RMi does not proceed with the following steps.

RMi selects the lock l1 as the victim to break the deadlock. RMi cancels the outstanding lock conversion for lock l1 and sends a CONVERTUPCOMPLETE(l1,vlblk, LM_DEADLOCK) message to the agent Ak that owns the lock tuple.

Failures

The failure of an agent or server is detected through the closure of a connection. The surviving servers and agents then each take steps to recover from this failure, as will now be described.

PM Failure

When one of the process managers PMk fails, information on processes is lost. The following steps are performed to recover from this.

First, a replacement process manager PMk is created or selected.

Each agent Ai then searches its agent process pool for process tuples whose owner is PMk, and sends these tuples to PMk. Each agent Ai then searches its pending queue for pending requests whose owner is PMk and retransmits them to PMk. The requests are sent in the order they are stored in the pending queue.

When PMk receives the process tuples from Ai, it adds them to its process pool. Processing of the retransmitted requests is deferred until all agents have sent their process tuples.

SM Failure

When one of the session managers SMk fails, information on sessions is lost. The following steps are performed to recover from this.

First, a replacement session manager SMk is created or selected.

Each agent Ai then searches its agent session table for session tuples whose owner is SMk, and sends them to SMk. Each agent Ai then searches its pending queue for pending requests whose owner is SMk, and retransmits them to SMk. The requests are sent in the order they are stored in the pending queue.

When SMk receives the session tuples from Ai, it adds them to its session pool. Processing of the retransmitted requests is deferred until all agents have send their session tuples.

RM Failure

When a resource manager RMk fails, the following actions are taken to recover from this failure.

First, a replacement resource manager RMk is created or selected.

Each transaction manager TMi then searches its edge pool and deletes all edge tuples that are owned by RMk. Antiprobe messages are sent as described above. This returns the RMs and TMs to a mutually consistent state.

Each agent Ai then searches its lock pool for lock tuples owned by RMk, and sends them to RMk. In other words, the agents re-send the granted lock states to RMk. When RMk receives these lock tuples, it adds them to its lock pool. RMk then reconstructs the resource and transaction tuples in its resource and transaction pools from the lock tuples, each lock being added to the lock set of the related resource and transaction tuple. This brings the agents and the RMs into a mutually consistent state.

Each agent Ai then searches its pending queue for lock conversion cancel requests previously sent to RMk. If any is found, it is removed from the pending queue and a "conversion complete" event with a "cancel" status is posted on the client's event queue.

Each agent Ai then searches its pending queue for pending requests whose owner is RMk, and re-sends them to RMk. Processing of these requests is deferred until all agents have sent their lock tuples.

This restores locks in the waiting queue. The original order in which the waiting locks were queued has been lost, but this information is in fact irrelevant. Therefore the waiting locks may be restored in a different order and waiting locks may even become granted when their lock mode is compatible with the other granted locks. Any dependencies that are detected between locks of transactions will cause INSEDGE messages to be sent to the TMs, instructing them to insert edges in the WFG.

TM Failure

If a transaction manager TMk fails, the following actions are taken to recover from the failure.

First, a replacement transaction manager TMk is created or selected.

Each other transaction manager TMi then searches its probe pool for probes previously sent to TMk, and re-sends these probes to TMk. Each other transaction manager TMi also searches its probe pool for probes owned by TMk, and for each such probe, generates an antiprobe. This brings the TMs back into a mutually consistent state. Note that any probes that arrive in TMk are not further forwarded since TMk does not yet contain any edges along which these probes can be forwarded.

Independently, in parallel with the above action of the TMs, each resource manager RMi checks for any dependencies between the locks in its lock pool and re-sends any resulting WFG edges to TMk. These edges may cause further probes to be generated.

Because the above steps are executed independently and in parallel, an RMi may start re-sending edges to TMk while other TMs are generating antiprobes for the lost edges, or are re-sending probes to TMk. The TMs and RMs do not require any global coordinator to coordinate the sequence of recovery steps.

Agent Failure

If an agent Ak fails, the following actions are taken to recover from the failure.

Each resource manager RMi searches its lock pool and deletes all lock tuples that are owned by Ak.

Each session manager SMi searches its session pool and deletes all session tuples that are owned by Ak.

Each process manager PMi searches its process pool and deletes all process tuples that are owned by Ak.

This brings all the agents, RMs, SMs and PMs into a mutually consistent state. The deletion of locks of agent Ak may result in dependency changes, and these are sent to the TMs as described above, which may cause further probe and antiprobe messages to be generated.

Client Failure

When an agent detects the failure of one of its clients, it removes all information about the client. The agent deletes all processes that are created by the client, closes all sessions that are opened by these processes and closes all locks that are opened by these sessions. The agent looks up all pending requests of the client. The client member in the pending tuple is set to the reserved value FAILED.

Whenever an agent receives a reply from any of the servers PM, SM, or RM the agent looks up the corresponding pending tuple in the pending queue, and checks whether the client member of this tuple has the value FAILED. If the value is not equal to FAILED, then an event may be posted on the client's event queue. Otherwise the client has failed and the agent does whatever is appropriate for the reply from the server. Possible replies from a server are a new process, an open session, an open lock, or a convert lock completion message. If a message is a reply on a process creation, an open session or an open lock, then the agent sends a delete process, a close session or a close lock message respectively to the server in question. Other messages are discarded by the agent. In all cases the related pending tuples are removed from the pending queue.

In summary, it can be seen that resilience to failure of the servers PM, SM and RM is provided by duplicating information between the servers and the agents (which are the users of these servers) rather than by duplicating the servers. Thus, if a server fails, the information in that server can be reconstructed from the information held in the agents. Similarly, resilience to failure of the servers TM is provided by duplicating information between those servers and the servers RM (which are the users of the servers TM). In this way, resilience can be achieved without any increase in the number of messages between users and servers in normal running.

I claim:

1. A distributed data processing system comprising a plurality of processing units wherein the processing units contain:

(a) a plurality of resources,
   (b) a plurality of user processes performing transactions which require access to the resources, and for producing lock requests, requesting locks on the resources for said transactions,
   (c) a resource manager responsive to said lock requests from the user processes, for maintaining a queue of lock requests that cannot be immediately granted, and for detecting dependencies between transactions caused by conflicting lock requests,
   (d) a transaction manager for storing a wait-for graph comprising a plurality of nodes representing transactions and a plurality of edges interconnecting the nodes and representing said dependencies between the transactions, each edge being labelled with the identities of the lock requests that caused the dependency, and
   (e) means for detecting a cyclic chain of dependencies in the wait-for graph and, upon detection of a cyclic chain of dependencies, for sending a deadlock message to the resource manager identifying a particular lock request as a victim for deletion to resolve the deadlock,
   (f) said resource manager comprising means responsive to said deadlock message for deleting said particular lock request.

2. A distributed data processing system comprising a plurality of processing units wherein the processing units contain:

(a) a plurality of resources,
   (b) a plurality of user processes performing transactions which require access to the resources, and for producing lock requests, requesting locks on the resources for said transactions,
   (c) a resource manager responsive to said lock requests from the user processes, for maintaining a queue of lock requests that cannot be immediately granted, and for detecting dependencies between transactions caused by conflicting lock requests,
   (d) a transaction manager for storing a wait-for graph comprising a plurality of nodes representing transactions and a plurality of edges interconnecting the nodes and representing said dependencies between the transactions, each edge being labelled with the identities of the lock requests that caused the dependency, and
   (e) means for detecting a cyclic chain of dependencies in the wait-for graph and, upon detection of a cyclic chain of dependencies, for sending a deadlock message to the resource manager identifying a particular lock request as a victim for deletion to resolve the deadlock,
   (f) wherein said transaction manager comprises a plurality of transaction manager processes, each of which holds a predetermined portion of the wait-for graph, said transaction manager processes comprising means for propagating probe messages between said transaction manager processes to detect cyclic dependencies,
   (g) wherein said resource manager comprises a plurality of resource manager processes each of which includes means for storing a plurality of locks on a resource, means for checking for dependencies between said locks, and means for sending insert edge and delete edge messages to the transaction manager processes instructing them to insert and delete edges in the wait-for graph corresponding to said dependencies,
   (h) wherein the system further includes means for allocating a replacement transaction manager process to replace a failed transaction manager process,
   (i) and wherein each resource manager process includes means for resending its insert edge messages to the replacement transaction manager process.

3. A system according to claim 2 wherein each transaction manager process includes means for storing probe messages it has sent to and received from other transaction manager processes and wherein each transaction manager process includes means for deleting stored probe messages received from said failed transaction manager process and for re-sending probe messages to said replacement transaction manager process.

4. A distributed data processing system comprising a plurality of processing units wherein the processing units contain:

(a) a plurality of resources, (b) a plurality of user processes performing transactions which require access to the resources, and for producing lock requests, requesting locks on the resources for said transactions, (c) a resource manager responsive to said lock requests from the user processes, for maintaining a queue of lock requests that cannot be immediately granted, and for detecting dependencies between transactions caused by conflicting lock requests, (d) a transaction manager for storing a wait-for graph comprising a plurality of nodes representing transactions and a plurality of edges interconnecting the nodes and representing said dependencies between the transactions, each edge being labelled with the identities of the lock requests that caused the dependency, and (e) means for detecting a cyclic chain of dependencies in the wait-for graph and, upon detection of a cyclic chain of dependencies, for sending a deadlock message to the resource manager identifying a particular lock request as a victim for deletion to resolve the deadlock, (f) wherein said transaction manager comprises a plurality of transaction manager processes, each of which holds a predetermined portion of the wait-for graph, said transaction manager processes comprising means for propagating probe messages between said transaction manager processes to detect cyclic dependencies, (g) wherein said resource manager comprises a plurality of resource manager processes each of which includes means for storing a plurality of locks on a resource, means for checking for dependencies between said locks, and means for sending insert edge and delete edge messages to the transaction manager processes instructing them to insert and delete edges in the wait-for graph corresponding to said dependencies, (h) wherein said system further includes means for allocating a replacement resource manager process to replace a failed resource manager process, (i) and wherein the transaction manager processes include means for deleting any edges associated with the failed resource manager process from their respective portions of the wait-for graph.

5. A system according to claim 4 wherein said user processes further include means for re-sending their lock requests to said replacement resource manager process.

* * * * *